United States Patent [19]

Oberg

[11] 4,117,692
[45] Oct. 3, 1978

[54] METHOD AND A SYSTEM FOR PRODUCING AND LAYING OIL OR GAS PIPELINES ON THE SEA BOTTOM

[76] Inventor: Karl Erik Öberg, Förrådsgatan 1, S-171 32 Solna, Sweden

[21] Appl. No.: 779,546

[22] Filed: Mar. 21, 1977

[30] Foreign Application Priority Data

Mar. 26, 1976 [SE] Sweden ............................... 7603676

[51] Int. Cl.² ................................................ F16L 1/04
[52] U.S. Cl. .................................... 405/166; 405/170; 405/158
[58] Field of Search ............... 61/72.4, 105, 107, 108, 61/109, 110, 111

[56] References Cited

U.S. PATENT DOCUMENTS

| Re. 28,410 | 5/1975 | Cox et al. | 61/109 |
| 3,540,226 | 11/1970 | Sherrod | 61/72.4 |

*Primary Examiner*—Mervin Stein
*Assistant Examiner*—David H. Corbin
*Attorney, Agent, or Firm*—Cushman, Darby & Cushman

[57] ABSTRACT

A method and system for producing and laying pipelines on the sea bottom. A continuous pipeline is produced on land near a quay and thereafter wound onto a floating pipeline storage reel. When a suitable pipeline length has been wound up onto the reel, the same is released from land and towed to the pipelaying site where the floating reel is coupled to a pipelaying vessel, whereafter the pipeline is unwound from the reel, straightened out and laid on the sea bed while the vessel is moved in the laying direction. The pipeline is laid on the sea with the aid of a pipeline carrier means attached to said vessel. This carrier means comprises a plurality of supporting yokes suspended one after the other from a common supporting cable attached to the vessel. The yokes are connected by means of two positioning cables keeping the yokes transversely to the supporting cable. Each yoke has an opening for the pipeline, the bottom of which opening is defined by a supporting roller for carrying the pipeline during laying. At the end portion of the carrier means there is attached to the supporting and positioning cables a ploughing means engaging the sea bed thereby subjecting the carrier means to a braking force keeping said means stretched during laying, and providing at the same time by its ploughing action a substantially smooth supporting area for the pipeline on the sea bed. When the pipeline length has been unwound from the floating reel attached to the vessel and laid down on the sea bed, the empty reel is disconnected from the vessel and transported back to land for a possible recharging with a new length of pipeline. As soon as said empty reel has been disconnected from the vessel, another floating reel loaded with pipeline can be connected to the vessel for continuing the laying of pipeline.

8 Claims, 7 Drawing Figures

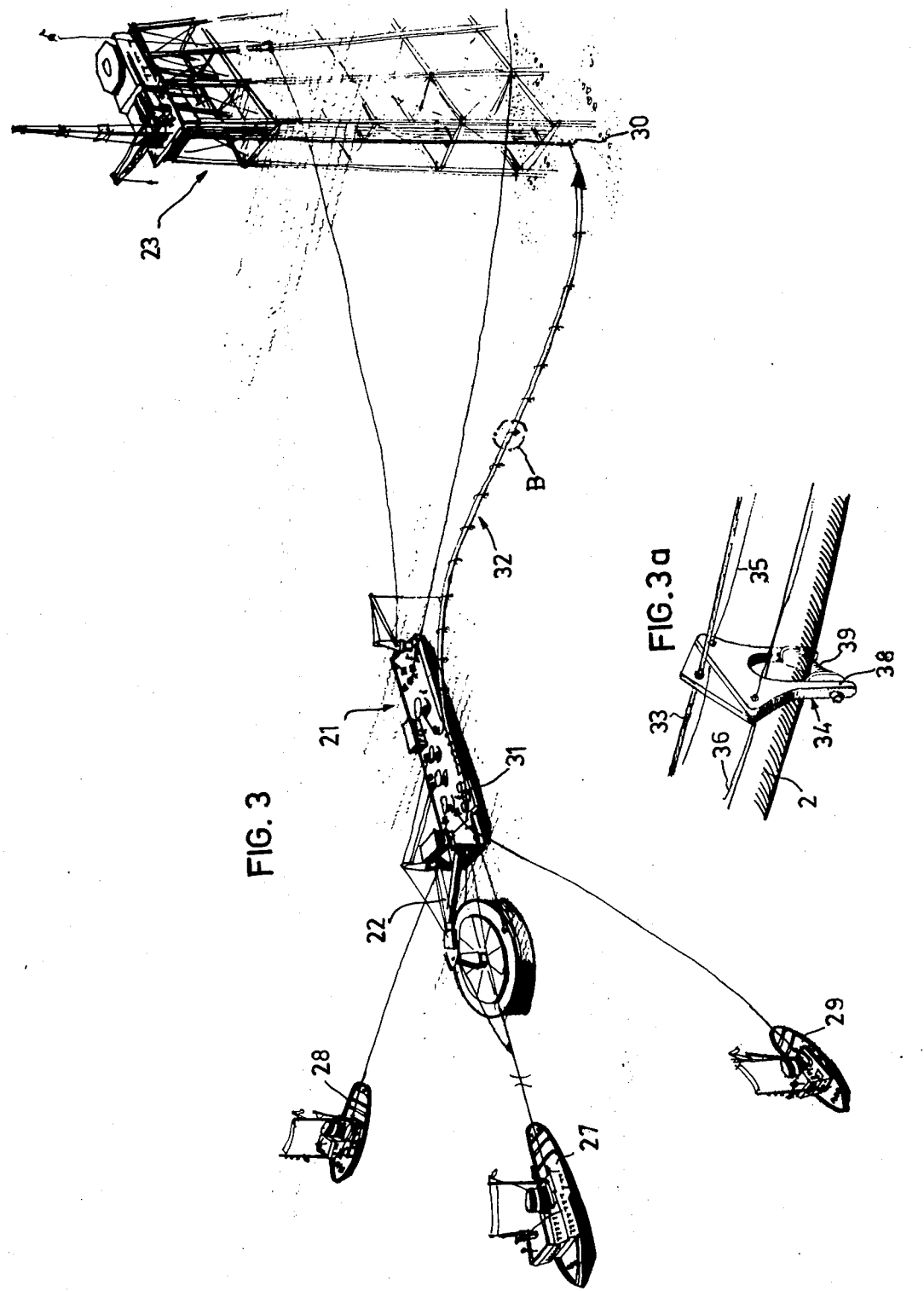

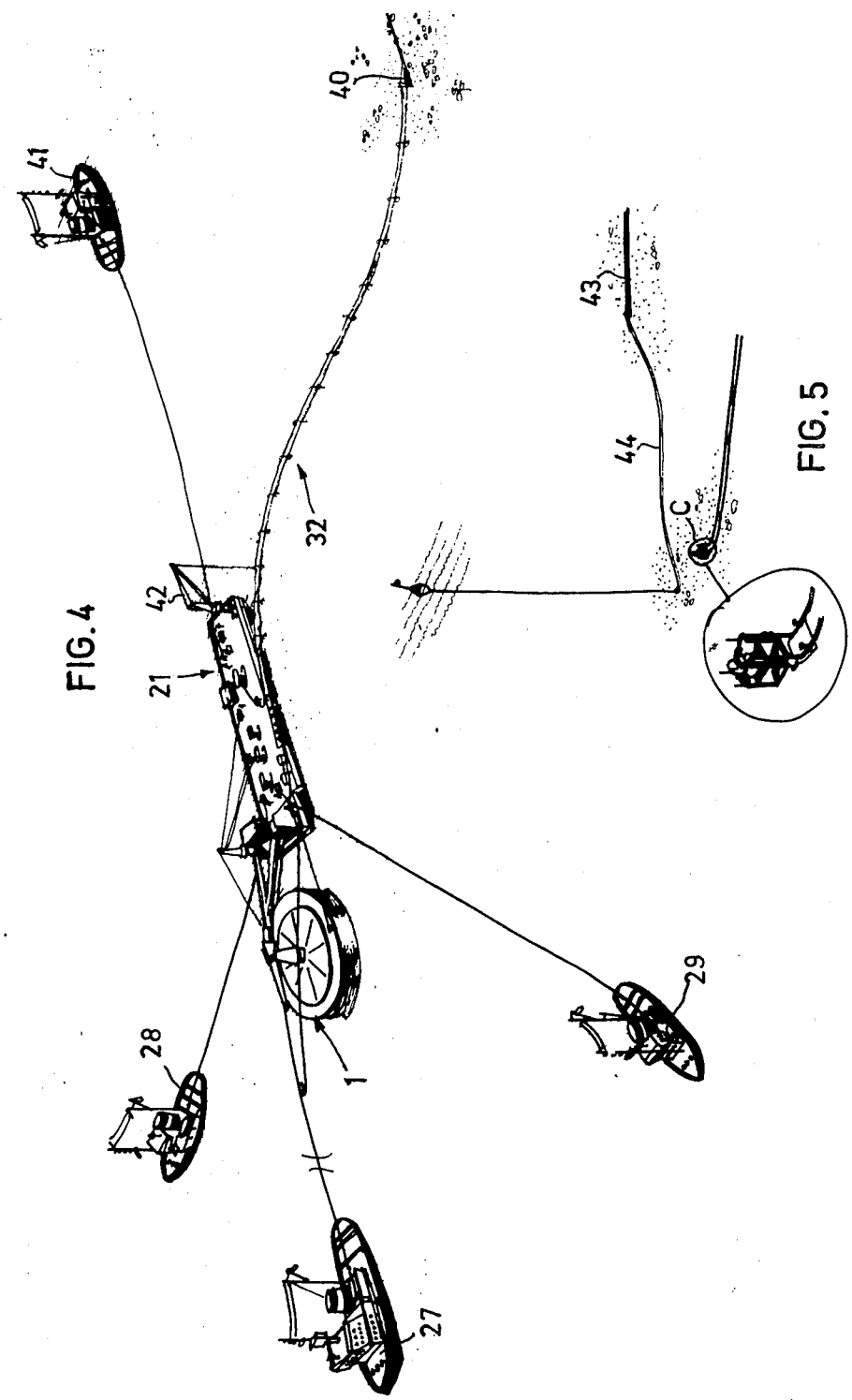

METHOD AND A SYSTEM FOR PRODUCING AND LAYING OIL OR GAS PIPELINES ON THE SEA BOTTOM

The present invention relates to a method for producing and laying oil or gas pipelines on the sea bottom using a pipelaying vessel, and a system for carrying out the method.

In step with the ever greater production of oil and gas from offshore fields during recent years, where oil/gas is produced from deposits situated under water, the need of subsea pipelines for transporting the oil/gas has also increased very rapidly. Here it is a question of either transporting the oil/gas from the offshoe field to land or also, and especially with regard to offshore oil fields, connecting a number of oil wells to a common buoy for storing and loading oil, which is then taken from the buoy to land by tanker.

Such a pipeline can either be manufactured at sea, starting with pipe lengths welded together on a pipelaying vessel to form the pipeline as it is laid on the sea bottom, or pipe lengths can also be joined together on land into continuous pipeline units which are then transported out to the site for laying on the sea bed.

The present invention relates to a new and improved technique for the above-mentioned type of production, transport and laying of long pipeline units.

Different types of pipelaying vessels provided with rotatably arranged storage reels are already known, continuous pipe being rolled onto the reel when the vessel is docked at an onshore supply base. In all cases, however, the vessel has the drum or reel permanently located in it, which means that after all the pipeline on the reel has been reeled off and laid, the pipelaying vessel must then put into port for "recharging" the reel with a new length of pipelne. This involves breaks in laying work costing both time and money, or it requires several pipelaying vessels.

Another drawback with pipelaying vessels working according to the known reeling technique is that the vessels must be large since the reel is very voluminous (reel diameters of about 24 m are used for a 12-inch pipeline, for example) and have a very large weight when the whole continuous pipeline length is wound up on the reel.

The primary object of the present invention is therefore to provide a new and more economical method of producing pipelines to be laid by pipelaying vessels on the sea bed, and a system for carrying out the method.

The new method is such that the pipelaying vessel does not need to put into port for "recharging" the storage reel, but that this, like a cassette or magazine, can be released from the vessel and replaced by a new magazine "loaded" with pipeline. It shall then be possible to transport the empty magazine reel into land for "reloading".

The method and system according to the invention shall moreover comprise the use of a pipeline carrier which can replace a so-called "stinger" of conventional design on the pipelaying vessel. The pipeline carrier used shall not only give the pipeline sufficient support in the water during the movement of the pipeline down to the bottom but shall also mechanically work over the bed so that the pipeline is not damaged when it comes into contact therewith.

According to the invention said objects and requirements can be met by the method for producing and laying oil or gas pipelines on the sea bed using a pipelaying vessel, this method being characterized by one pipe length at a time being taken from at least one stock of straight pipe lengths on land, e.g. near a quay, and by welding the pipe length to previously extracted and welded-together pipe lengths so that they form at least one successively extended pipeline which is then subjected to necessary surface treatment, e.g. shot or sand blasting, and is thereafter curved while being driven forward, painted and provided with insulation when necessary, whereat the pipeline is wound onto a reel formed as a floating pipeline storage drum in step with joining on new pipe lengths, said drum being retained rotatably floating from land (the quay) for release therefrom when the desired amount of pipeline has been wound up onto it and for transportation, e.g. by towing, to the pipelaying site in question where it is coupled to the pipelaying vessel, whereafter the pipeline is successively unwound from it, straightened out and, while the vessel is travelling in the laying direction, laid out on the sea bed with the aid of a pipeline carrier means attached to the vessel, the pipeline passing through said carrier means on its way to the sea bed.

It should be noted that in this connection the term "pipelaying vessel" used above refers to all possible types of such vessels, e.g. barges, modified bulk carriers, semi-immersible laying vessels etc. The laying vessel can thus either be provided with its own propelling machinery or not. Since the reel floats in the water even when it is laden with the whole of the pipeline wound onto it, it can be transported out to the laying vessel by towing. To achieve a greater towing speed for the loaded reel during its transport from land out to the laying vessel, it is however most suitable in practice for the reel to be placed on an immersible pontoon, which, after having been manoeuvered into position under the reel, is emptied to such an extent that the reel is lifted out of the water. Since the pontoon can be given a shape substantially more like that of a ship than can be given to the reel, it will be possible to increase the towing speed of two to three knots for the floating reel itself to about eight to ten knots for the pontoon carrying the reel. In practice, transporting the reel on the pontoon would primarily be used when the distance between the supply dock and laying site is such that the rate of towing is of some importance.

One of the advantages of the method according to the invention is that a number of loaded storage reels can be kept in readiness in the immediate vicinity of the laying vessel during laying. These reels can have pipelines with different diameters.

Straightening up the pipeline unwound from the reel can either be done on some kind of straightening equipment arranged on the deck of the laying vessel, or with straightening equipment mounted on the reel. Vessel travel in the laying direction can be brought about with the help of tugboats and/or propelling machinery on the laying vessel.

The method according to the invention is suitably combined with the use of a pipeline carrier formed as a wire rope support means attached to the vessel, with a plurality of spaced supporting yokes carrying the pipeline by means of supporting rollers during laying, said pipeline carrier having an end means at the sea bed which by a ploughing action against the sea bed provides the necessary strain on the pipeline carrier and also makes a channel or trench for the pipeline. Although such a pipeline carrier is to be preferred, it is naturally quite possible to use a conventional stinger construction for carrying the pipeline. However, experience has shown that much of the damage occurring on pipelaying vessels affects just the stinger, which is the steel structure projecting aft from the laying vessel used for avoiding buckling of the pipe during laying just as the pipeline runs out into the water from the laying vessel.

When the whole continuous pipeline unit has been reeled off from the reel coupled to the laying vessel, the empty reel itself is then uncoupled from the vessel and replaced as necessary with a new reel, the pipeline on which is jointed (welded) to the end of the pipeline already laid. After this operation pipelaying can be continued.

A still further advantage with the method according to the invention is that pipeline reels of completely different sizes can be used together with one and the same pipelaying vessel. The reason for this is, as mentioned above, that the reel floats by itself and is only coupled to the laying vessel.

The system for carrying out the method according to the invention is primarily characterized by a stock of pipe lengths being arranged on land, between the stock and a rotatably retained floating storage reel adjacent land (quay) there being arranged stations for welding the pipes into a pipeline, sand/shot blasting, curving, traction, painting and isolating the pipeline before it is wound up on the reel, the latter being so formed that it floats with its rotational axis vertical and with its upper face having a central mounting which (during loading the reel) is articulatedly connected to one end of a boom attached to land (quay), the reel being kept at a desired distance from the last station by the boom.

On the upper face of the reel there is suitably attached a driving wheel, around the circumference of which there is wound a wire rope extending from the driving wheel to a capstan or the like placed on land, wherewith the rope can be rolled off from the wheel to rotate the reel for winding the pipeline around the reel core. It is suitable for the land end of the boom to be so articulatedly fixed that the boom can swing in a vertical plane when the pipeline is wound up on it, to compensate for alterations in the floating position of the reel.

The pipelaying vessel has a reel coupling means which can be of the same kind as the boom on land, said means having the form of a boom structure projecting from the vessel, in the end of the structure there being a pivotable coupling with limbs between which the central mounting of the reel can be pivotably coupled. By this type of coupling of the reel central mounting it is ensured that no damage is done either to the reel or to the vessel when these move individually, e.g. as a result of the motion of the sea. Without such a "universal joint" connection of the reel, laying work would need to be disrupted even for a moderate sea.

The pipelaying vessel preferably has a capstan or the like for rotating the reel during pipelaying, there being either on the reel or on the vessel deck a straightening device which is passed through by the pipeline on its way from the reel to the pipeline carrier means. On the deck of the laying vessel there is also, if needed, an apparatus for casing the pipeline with concrete before it goes into the water.

The pipeline carrier attached to the pipelaying vessel preferably includes a plurality of supporting yokes suspended from at least one supporting cable attached to the vessel, said yokes being united with two or more locating cables which keep the yokes in position transversely to the supporting cable. These supporting yokes have a through-opening for the pipeline, defined at the sides by limbs between the lower ends of which there is rotatably mounted a supporting roller which carries the pipeline during laying.

In a preferred embodiment of the system according to the invention the pipeline carrier means extends from the laying vessel down to the sea bed, the cables of the means being attached to an end portion of the means consisting of a plough means engaging with the sea bed. During movement of the vessel in the direction of travel this plough means supplies both the braking force at the end of the carrier means required for keeping the means stretched in a desired way, and the formation of a channel or trench in the sea bed in which the pipeline is laid.

The method according to the invention and the system for carrying it out will now be explained further while referring to a preferred embodiment shown on the appended drawings.

FIG. 1 on the drawings shows in perspective the production of a continuous pipeline which is successively wound up on a storage reel floating in the water outside a quay, a boom structure being used to hold the reel at a desired distance from the quay while the pipeline is being wound onto the reel;

FIG. 3 shows in a view similar to the one in FIG. 2 how the situation appears in the beginning of laying the pipeline, starting from the coupling point on the sea bed under the drilling platform;

FIG. 3a shows one of the carrying yokes included in the pipeline carrier means attached to a side of the laying vessel;

FIG. 4 shows the situation during laying of the pipeline; and

FIG. 5 finally shows a detail of the connection between a buoyed rubber hose and well head X-mas tree.

Figure 1:
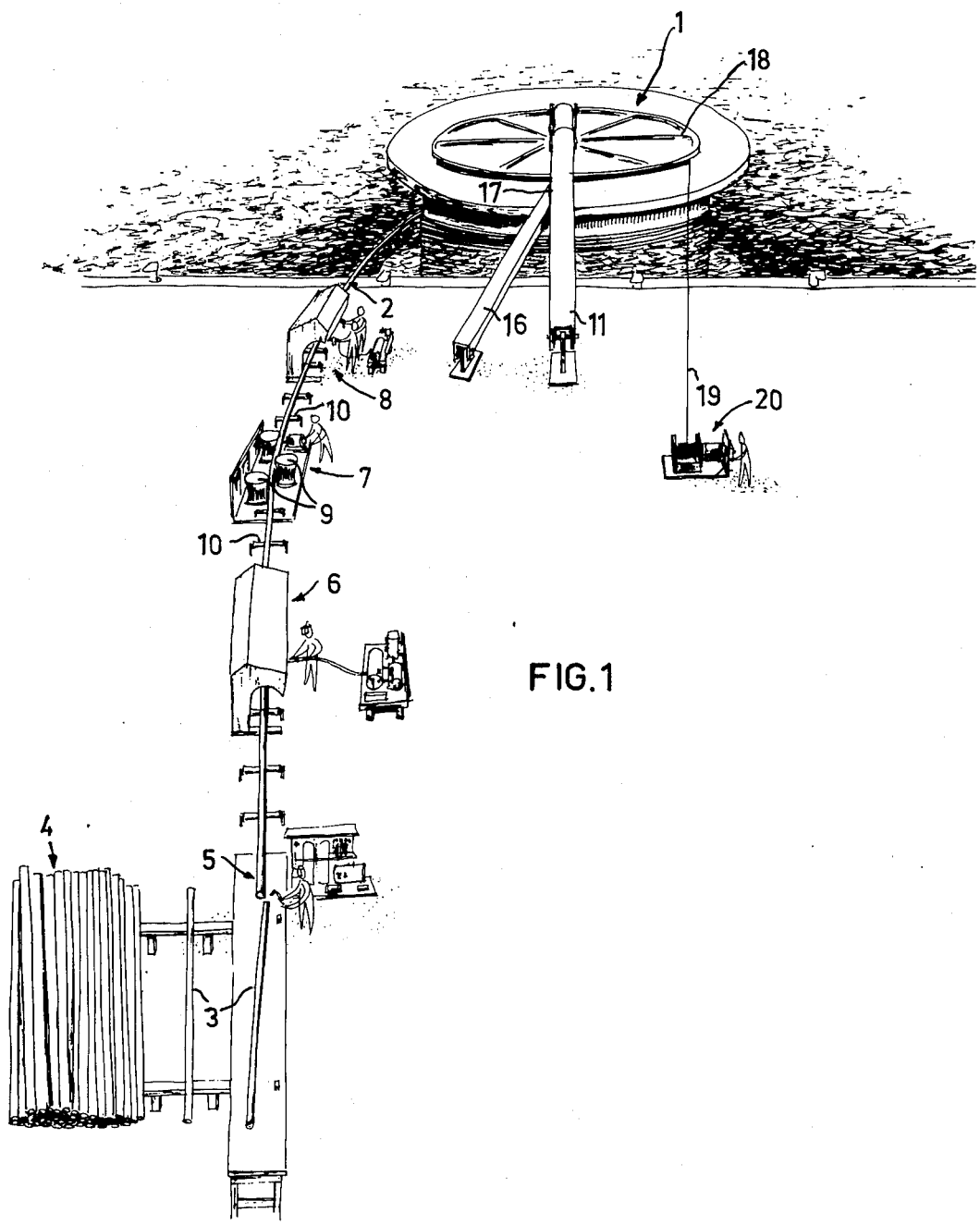

In FIG. 1 it is shown how a continuous pipeline is manufactured on a supply quay, the pipeline being wound up onto a storage reel 1 floating adjacent the quay. To produce the continuous pipeline 2 one pipe length 3 at a time is taken from a stock 4 of straight pipe lengths on the quay. In the welding station 5 the last pipe length 3 taken is welded at its front end into the rear end of previously extracted and welded pipe lengths forming the continuous pipeline 2. Before the continuous pipeline thus produced is wound up on the storage reel 1 it is subjected to necessary treatment at a number of stations on the quay. In the example shown these stations comprise a sand or shot blasting station 6, a station 7 for curving and driving the pipeline forward and a station 8 for painting and insulating. The motor driven rollers 9 at the station 7 take care of necessary curving of the pipeline and its forward travel to the storage reel 1. The pipeline 2 consisting of welded-together pipe lengths 3 is advanced on the quay over the rollers 10.

The storage reel 1 floats in the water with its rotational axis vertical, and during loading, i.e. winding the pipeline 2 onto the reel core, it is kept at a suitable distance from the quay by means of a boom 11 mounted on land. For this purpose the storage reel 1 is provided with a central mounting (see FIG. 2a), generally denoted by the numeral 12. By means of the shaft 13 the central mounting 12 is pivotably attached between parallel limbs 14 of a coupling sleeve 15 rotatably mounted on the outer end of the boom 11. To stabilize the boom 11 and take up transverse forces thereon there is a side strut 16 attached at 17 to the boom 11. Both the side strut 16 and the boom 11 are so fixed at the ends on land that they can swing in a vertical plane to compensate for the altered floating position of the reel 1 caused by the weight of the pipeline 2 wound onto it. Since the drum or reel 1 floats in the water, the boom 11 does not need to take up any forces in the vertical direction from the reel or the pipeline wound onto it. On the upper face of the reel 1, formed as a floating storage drum, there is attached a driving wheel 18 around the circumference of which a cable 19 is wound. The cable 19 extends from the driving wheel 18 to a winch generally denoted 20 placed on land. When the cable 19 is wound up on the winch drum, it is wound off the driving wheel 18, causing the reel 1 to rotate about its central mounting. As an example of the conveivable dimension of the pipeline reel 1, it may be mentioned that the outside diameter of the reel can attain 60–80 m when the reel is intended for an 18 to 24-inch pipeline. The method and apparatus according to the invention is of course utilizable for larger pipelines, e.g. those with a diameter of 36 inches. When the desired length of pipeline has been wound up on the storage reel 1, the latter is released from the quay and transported either floating by itself or raised up on a pontoon to the pipelaying site, preferably by towing. At the laying site the reel 1 is coupled to the pipelaying vessel 21, see FIG. 2. For this purpose the pipelaying vessel has a reel retaining structure 22 corresponding to the boom 11 on land, and which preferably consists of a boom structure projecting from the fore of the vessel, there being at the outer end of this structure a rotatable coupling 15 between the limbs 14 of which the central mounting 12 of the reel can be pivotably coupled in the same way as has been described for the coupling at the end of the boom 11 according to FIG. 1.

Figures 2, 2A:
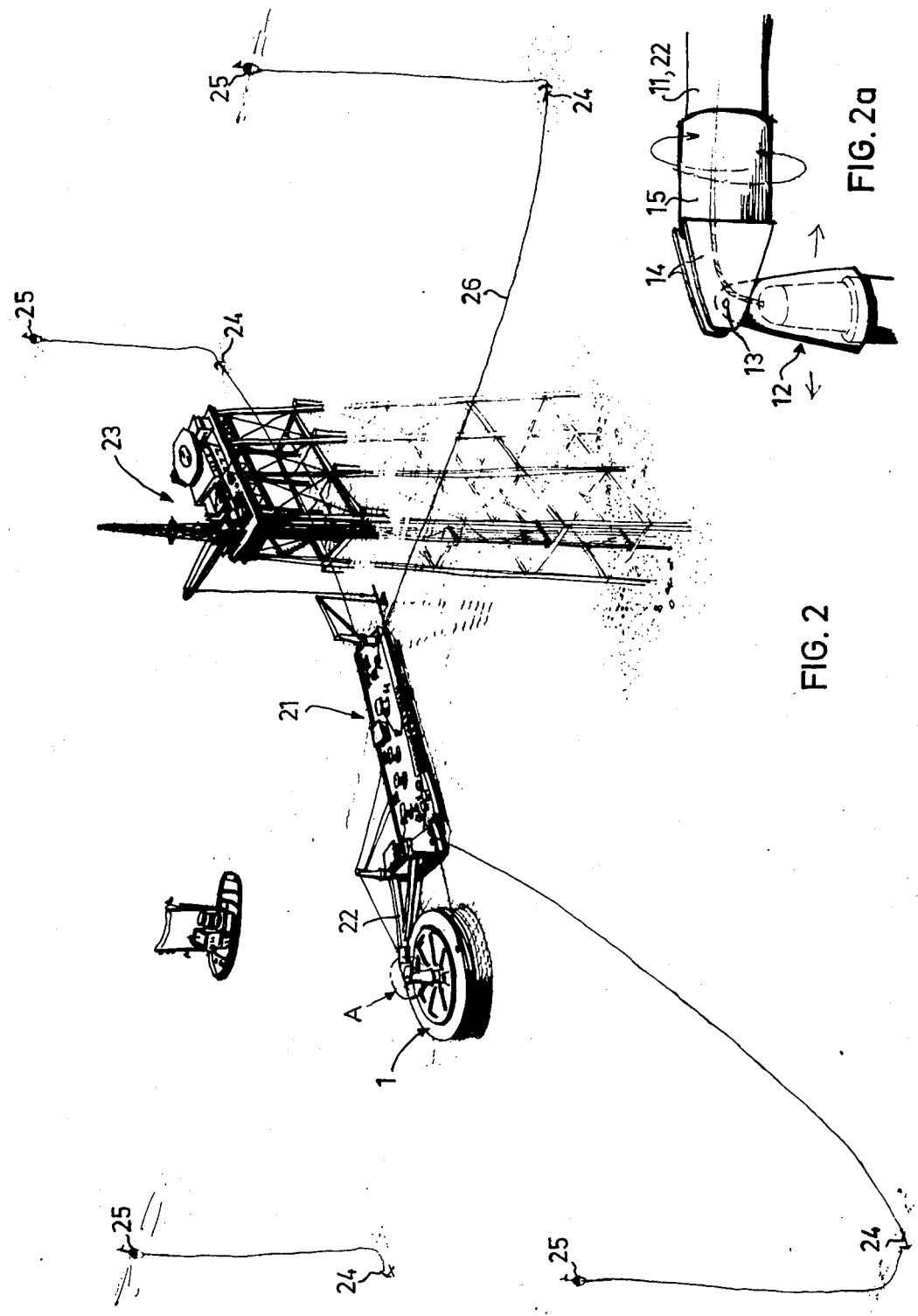
FIG. 2 shows in perspective the situation when a loaded storage reel has been coupled to a laying vessel and pipelaying is begun at a drilling platform standing on the sea bed.
FIG. 2a shows to a larger scale the articulated attachment of the reel centre bearing in the end of the boom structure projecting from the laying vessel.

FIG. 2 is now referred to, this figure showing how the storage reel 1 is coupled to the pipelaying vessel 21 lying in position adjacent the drilling platform 23 standing on the sea bed. On the drawing the numerals 24, 25 and 26 denote anchor, anchor buoys and anchor chains, respectively. The anchors 24 are used to keep the pipelaying vessel 22 in position relative to the oil drilling platform 23 before pipelaying is commenced.

The articulated coupling between the storage reel 1 and the reel retaining structure 22 within the circle A in FIG. 2 is shown to an enlarged scale in FIG. 2a.

In FIG. 3 there is shown the situation at the beginning of pipelaying, the pipelaying vessel 22 being moved in the laying direction with the assistance of the tugboats 28, 27 and 29. In this figure the numeral 30 denotes the place where the pipeline 2 is connected to a pipe through which oil is taken up from the well. On the deck of the pipelaying vessel 21 there is a winch or capstan (not more closely illustrated) for rotating the reel during pipelaying, a straightening apparatus 31 through which the pipeline passes on its way from the reel 1 to the pipeline carrier generally denoted by the numeral 32. This carrier has the task of supporting and guiding the pipeline right from the pipelaying vessel 21 down to the sea bed on which the pipeline is laid. The pipeline carrier means 32 consists of a plurality of supporting yokes 34 suspended on a common supporting cable 33 (see FIG. 3a), the yokes being arranged at an even pitch along the cable 33. These supporting yokes 34 are commonly united by two parallel position-maintaining cables 35 and 36 keeping the yokes in position transversely with respect to the supporting cable 33. The supporting yokes have through-openings 37 for the pipeline 2, the size of these openings being defined by dependent limbs 38 between which a supporting roller 39 is rotatably mounted, the pipeline 2 running over this roller during laying.

One of the supporting yokes 34 incorporated in the pipeline carrying means 32 is shown within the circle B in FIG. 3, which in turn is shown to a larger scale in FIG. 3a.

The pipeline carrying means 32 extends from the pipelaying vessel 22 right down to the sea bed. At the bottom end of the means 32 the cables 33, 35 and 36 are attached to an end portion 40 (see FIG. 3) consisting of a ploughing means engaging with the sea bed. During laying, i.e. the movement of the vessel 22 in the laying direction, this ploughing means 40 at the end of the carrier means exerts a braking force holding the means stretched in a desired way, the ploughing means 40 being so formed that during movement along the sea bed it prepares the latter for the pipeline (e.g. levelling off the bed surface and pushing away stones) thereby providing a channel or trench in the bed for the pipeline.

FIG. 4 is now referred to, wherein the pipelaying vessel 21 is shown during pipelaying. In addition to the tugboats 27, 28 and 29 a further tugboat 44 is used to keep the vessel on the pipelaying course. Apart from the straightening apparatus 31 on the deck of the vessel 21 there can also be apparatus for putting final insulation onto the pipeline. This can for example consist of casing the pipeline in concrete before it goes into the water. During the passage of the pipeline 2 along the deck of the vessel 21 it is also possible to add smaller pipes to the pipeline, e.g. for hydraulic control of valves, electrical cables and the like. The crane 73 shown on the drawing aft in the laying vessel 21 has the task of giving the pipeline carrier means 32 a suitable curvature at its upper end.

After the whole of the pipeline has been wound off from the reel functioning as an exchangeable magazine, the empty reel can be uncoupled from the laying vessel 21 and be replaced as needed by a new loaded storage reel 1, the pipeline from which is joined to the end of the previous one on the deck of the laying vessel at a welding station on the deck.

When pipelaying has reached its termination, a rubber hose is connected to the end 43 of the pipeline 2. In FIG. 5 there is shown a detail of the connection with a buoyed rubber hose 44 and a so-called "well head X-mas tree". Said X-mas tree is shown to a larger scale within the circle C in FIG. 5.

Although the description above is with reference to laying one pipeline there is nothing to prevent using the technique according to the invention for laying two or more pipelines collected into a bundle. Such a bundle consists, for example, of three 4-inch pipelines or two 6-inch pipelines and one 4-inch line.

Finally, it should be remembered that the above description is in no way intended to restrict the method or system of the invention, and is only intended to account for a conceivable embodiment of the invention. Multifarious alternative embodiments are possible within the framework of the following claims which define the scope of the invention.

What I claim is:

1. In a method for establishing a pipeline on the bottom of a body of water the steps comprising: joining pipe lengths end-to-end in sequence at a first location to form a continuous pipeline; forwarding the pipeline in its longitudinal direction, as it is formed, to a second location and winding the pipeline at the second location on to a floating storage reel maintained in said body of water; moving the floating storage reel through the water to a pipe-layig site; coupling the reel to a floating pipe-laying vessel at the site while maintaining the reel floating independently of the vessel; unwinding the pipeline from the floating drum and transferring the pipeline in its longitudinal direction, as it is unwound, to the pipe-laying vessel; and feeding the pipeline in its longitudinal direction, as it is received from the floating reel from the pipe-laying vessel to the submerged bottom.

2. A method as in claim 1 wherein the step of feeding the pipeline from the pipe-laying vessel to the submerged bottom includes extending a flexible pipeline carrier from the vessel to the submerged bottom, moving the vessel and the carrier through the water and simultaneously feeding the pipeline downwardly along the carrier while supporting the downwardly moving portion of the pipeline from the carrier.

3. A method as in claim 1 wherein after the entire pipeline has been unwound from the floating reel, the reel is uncoupled from the vessel; then moving a new floating reel with a new pipeline wound thereon into proximity with the vessel; coupling the new reel to the vessel; and connecting the leading end of the new pipeline to the trailing end of the old pipeline.

4. A method as in claim 1 wherein said first location is on land and including the step of releasably connecting the floating reel to the land during winding of the pipeline on to the reel.

5. In a method for establishing a pipeline on the bottom of a body of water the steps comprising: providing in the body of water a floating reel having a vertical axis; winding a continuous pipeline on to the reel by feeding the pipeline in its longitudinal direction to the reel and simultaneously rotating the reel about the vertical axis of the reel; moving the reel through the water to a pipe-laying site; coupling the floating reel to a pipe-laying vessel at the site; unwinding the pipeline from the reel by rotating the reel and simultaneously transferring the pipeline in its longitudinal direction to the floating pipe-laying vessel; and transferring the pipeline, in its longitudinal direction as it is received from the reel, from the pipe-laying vessel to the submerged bottom.

6. A method as in claim 5 wherein the step of feeding the pipeline from the pipe-laying vessel to the submerged bottom includes extending a flexible pipeline carrier from the vessel to the submerged bottom, moving the vessel and the carrier through the water and simultaneously feeding the pipeline downwardly along the carrier while supporting the downwardly moving portion of the pipeline from the carrier.

7. A method as in claim 5 wherein after the entire pipeline has been unwound from the floating reel, the reel is uncoupled from the vessel; then moving a new floating reel with a new pipeline wound thereon into proximity with the vessel; coupling the new reel to the vessel; and connecting the leading end of the new pipeline to the trailing end of the old pipeline.

8. A method as in claim 5 wherein during the winding step the pipeline is fed from a site on land while the floating reel is releasably connected to the land site.

* * * * *